Jan. 23, 1962  J. W. LEHDE, JR  3,017,643
ADJUSTABLE TAP STOP MEANS FOR LIMITING DEPTH OF THREADING
Filed March 9, 1959
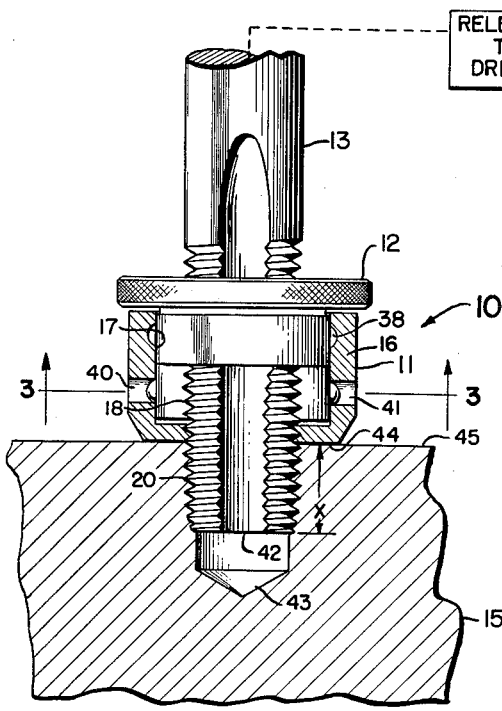
INVENTOR
JOHN W. LEHDE JR.
BY
Brown, Jackson, Boettcher & Dienner
ATTORNEYS

United States Patent Office 3,017,643
Patented Jan. 23, 1962

3,017,643
ADJUSTABLE TAP STOP MEANS FOR LIMITING DEPTH OF THREADING
John W. Lehde, Jr., Chicago, Ill., assignor to Scully-Jones and Company, Chicago, Ill., a corporation of Illinois
Filed Mar. 9, 1959, Ser. No. 798,165
3 Claims. (Cl. 10—129)

This invention relates to tapping tools for threading bores in work-pieces, such as motor blocks, transmission housings, and the like, and has for its principal object the provision of a new and improved stop means to control the depth of a tap as it threads into the work-piece.

In work-pieces with thin sections below the bore to be tapped, or where tapping too deep into a work-piece will destroy a valve seat or the like, it is desirable to have an accurate means of controlling the depth of penetration of the tapping tool. Heretofore it has been conventional, in attempting to control this depth, to provide a stop means in the form of a trip mechanism which will release the driving means for the tap as soon as the tap has reached this pre-selected depth, or to attempt to control the depth by watching the tap as it penetrates the bore. It has been found, however, that in such prior art tapping means the depth could not be controlled because the trip mechanisms, among other things, did not compensate for variable height surfaces on the work-piece, with the resulting irregularity in the depths of the tap in a plurality of bores in any one work-piece, or a plurality of work-pieces, and the method of watching the depth of the tap is subject to obvious inaccuracies, with the result that such devices were unsuitable for mass production methods. Too, trip mechanisms gave no indication of the maximum torque encountered by the tap driver as the tap penetrated the bore.

Other attempts at producing a controlled depth of a tap embodied a stop means on the tap itself. However, such prior art stop means required the disassembly thereof to adjust the depth of the tap to be made, and lacked ease of adjustability.

I have overcome the above disadvantages by providing a stop means for a tap, usable in conjunction with a release torque driver. When the tap is driven into a bore of a work-piece and reaches a pre-selected depth, the stop means engages the face of a work-piece and locks the same thereagainst so that the torque driver, having been set at a preselected torque, frees the tap, or disconnects it from its power source, in such a manner that the driving mechanism no longer urges the tap into the bore. Obviously, if the bore were too small, the torque encountered by the torque driver would soon reach its preselected maximum and release the driving means from the tap as an indication of improperly bored holes in a work-piece.

This tap stop means, in the embodiments illustrated herein, comprises an adjustable rotary type nut fitted in threaded relationship on the tap itself, and provided with a locking ring which cooperates with the stop nut. This locking ring locks the stop nut in its position on the tap when the ring is in one position in connection with the stop nut, and permits rotary adjustment of the stop nut with respect to its position on the tap, to select the depth of the tap when the ring is in a second position. The locking ring and the stop nut have a means for connecting the two together. An important feature of the connecting means is the fact that adjustment and selection of the depth of the tap can be made without total disassembly of the stop means, and the lock ring has an additional important advantage in that, when connected to the stop nut in the position permitting selection of the depth of the tap, it serves as a guide to permit ease of assembly and disassembly of the stop nut on and off the tap itself.

Accordingly, still another object of my invention is the provision of a new and improved tap stop which may be adjusted without total disassembly to select the depth of the tap, which is provided with a new and improved connecting means which permits the locking ring and stop nut to be locked and unlocked conveniently and easily on the tap when the correct or pre-selected depth has been made.

Still another object of my invention is the provision of a tap stop which, when used in connection with a torque driver, will provide an accurate and adjustable control for the depth of the tap and the work-piece, a measure of the maximum torque at which the tap is penetrating the bore, and which is suitable for use in mass production methods.

Other and additional objects of my invention will be apparent to those skilled in the art from the following description and drawings forming a part hereof and wherein:

FIGURE 1 is an elevational view, partly in section, illustrating to advantage my tap stop means with the stop nut engaging the face of a work-piece and with the locking ring in a position to lock the stop nut on the tap;

FIGURE 2 is an elevational view illustrating the locking ring and the means connecting the same to the stop nut in position permitting the stop nut to be adjusted on the tap;

FIGURE 3 is a cross-sectional view taken along line 3—3 of FIGURE 1, illustrating to advantage the connecting means between the locking ring and the stop nut;

FIGURE 4 is an elevational view of another embodiment of the locking ring; and

FIGURE 5 is an elevational view, in section, illustrating another embodiment of a stop nut to be used in connection with the locking ring illustrated in FIGURE 4.

In the drawings I have illustrated my invention as comprising, generally, a tap stop means illustrated in its entirety as 10, and comprising a stop nut 11, a locking ring 12, secured to a conventional tap or tapping means 13 and adapted to be driven by a releasing tap driver 14 into a work-piece 15.

In the embodiment illustrated in FIGURES 1, 2 and 3, the stop nut 11 comprises a nut body having a large circular cylindrical counterbore 17 which terminates in a smaller internally threaded bore 18, the diameter and threads of the latter threadably mating and receiving threads 20 of the tap 13. The body 16 is further provided with a pair of smaller longitudinally extending counterbores 21 and 22, diametrically opposite one another and opening radially into the threaded bore 18 (as more clearly illustrated in FIGURE 3) to receive and form part of a connecting means of the locking ring 12, yet to be described.

The locking ring 12 comprises a lock body 23 adapted to be telescopingly received in bore 17 and is provided with a radially extending flange 24. Body 23 is provided with a counterbore 26, the diameter of which is just slightly greater than the outer diameter of the threads 20 of the tap 13 so that the locking ring may slide freely over the tap threads and yet be aligned with the axis of rotation of the locking ring and the tap. The body 23 is further provided with a pair of axially extending cylindrical projections or extensions 27, 28. These projections, as can be seen in FIGURE 2, by reason of their diameter extend radially inwardly of the side walls of the bore 26 yet are slidably contiguous with the bores 21 and 22 of the stop nut. Thus, when the locking ring and the stop nut are in telescoping relation, projections 27, 28 complement two grooves or flutes 30, 31 of the conventional four of tap 13. The projections 27 and 28 are further radially counterbored, as at 32 and 33, to receive spring biased detent means in the form of balls 34 and 35 which are held captive in the locking ring by peening the edges as at 36, 37, in a conventional manner. Thus, the balls 34 and 35, through the action of their respective springs, radially engage portions on the stop nut 11, now to be described.

Nut body 16 is provided with a recess or groove 38 opening into counterbore 17 and adjacent the upper end thereof. In one adjusting position of the lock nut 12, recess 38 receives the balls 34 and 35 in a manner illustrated in FIG. 2. The stop nut is further provided with a pair of radially extending bores 40 and 41, the diameter of each of which is smaller than the outer diameter of the balls 34 and 35, to partially receive the balls 34 and 35 in a manner illustrated in FIGURE 1. This is the second or locking position of the locking ring.

In the assembly and operation of my tap stop, it is preferable, first, that the tap is inserted in the bore 26 of the lock ring with the projections received in grooves or flutes 30 and 31, of the tap, and second, that the lock ring 12 is then inserted in telescoping relationship in the counterbore 17 of the stop nut 11, so that the spring pressed detents 34, 35 are urged radially outwardly into the groove 38 so that the tap stop is in the adjusting position, such as illustrated in FIGURE 2. In this manner I have found that it is relatively easy for the nut 11 to be threaded onto the threads 20 of the tap 13 because the bore 26, in conjunction with the projections 27 and 28, serves as an aligning device for the threads 18 of the stop nut. When the nut 11 reaches a pre-selected distance from end 42 of the tap 13 so that the tap penetrates the bore, such as 43, of the work-piece 15 by a distance X, for example, the locking ring is pushed in further into the stop nut so that the detents 34, 35 are partially received in the bores 40, 41, as aforesaid. In this latter position the stop nut 11 is locked on the tap 13.

Thus, as the releasing tap driver 14 rotates the tap 13 to penetrate the bore 43, when end surface 44 of the stop nut reaches the top surface 45 of the work-piece 15, the threads 20 and 18, together with the surfaces 44 and 45 tend to stop rotation of the tap 13. The tap driver, being set to release at a pre-determined selected maximum torque, will release or disconnect the power source so that the tap 13 no longer tends to penetrate the bore 42. As can be appreciated, my tap stop provides an accurate means of controlling the depth of the tap, particularly since it rests on the top surface 45 immediately adjacent the bore 43 and because of the positive action lock means, a plurality of bores may be tapped accurately and easily. This is especially true when torque driver 14 is of the type disclosed and claimed in the U.S. Patent 2,775,326 to Better and Lehde dated December 25, 1956, entitled "Torque Drivers," or in the U.S. Patent 2,791,304 to Better and Lehde dated May 7, 1957, entitled "Safe Torque Driver" or in the U.S. Patent 2,819,635 to Better and Lehde dated January 14, 1958, entitled "Power Operated, Pre-determined Torque Release Tool," which I prefer to use, although other torque or tap drivers may be used which have in operative connection therewith a means of selecting a maximum value of torque above which the tap will be free of torque.

Turning now to FIGURES 4 and 5, it can be seen that the locking ring shown in FIGURE 4 and the stop nut shown in FIGURE 5 are identical in many respects with the locking ring and stop nut shown in FIGURE 2 and thus, wherein like parts are illustrated in the embodiment shown in FIGURES 4 and 5, I have identified them with the same reference numeral, plus a suffix *a*. It is to be noted, however, that the projections 27*a*, and 28*a*, of the lock ring 12*a*, instead of being provided with detent means, are merely provided with grooves or recesses 50 and 51 which cooperate with a split ring 52, located in recess 38*a* in the stop nut 11*a*. Thus the split ring 52, together with the recesses 50 and 51, replace, in function, the detent means 34 and 35. In order to provide for a locking means in this embodiment, the locking ring 12*a* is further provided with a peripheral recess or groove 53 near its flange which cooperates with the split ring 52 to lock the locking ring and stop nut together, as do the detents 34, 35 and bores 40, 41 in the other embodiment. When the lock body is telescoped in the nut substantially as shown in FIG. 1, the grooves 38*a* and 53 are then opposed, with the ring 52 engaged in both. Thus the embodiment of the tap stop illustrated in FIGURES 4 and 5 functions identically with the embodiment of the tap stop in FIGURES 1, 2 and 3 in connection with a tap, such as 13, and tap driver, such as 14.

It is to be understood also that while I have shown a tap with four grooves or flutes, my invention can be used with a tap having any number of such flutes, and while I have referred to the various parts of my invention as being located in a right or left or an upper or a lower or an inward or an outward position, it will be understood that this is done solely for the purpose of facilitating description, and that such references relate only to other relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. Tap stop means for adjustably limiting the effective length of a tap having a flute extending longitudinally thereof, comprising a nut member threadedly engageable on said tap for adjustable positioning longitudinally thereof and having a longitudinally extending recess projecting radially outwardly from its central opening, said recess being disposable in opposed relation to said flute by rotation of the nut member, a locking member slidable longitudinally of the tap having a portion engaged with the flute and engageable with the nut member recess to prevent rotation of the nut member, and means for detachably connecting the locking member and nut member said connecting means adapted to hold the locking member alternatively in said nut-engaging position and in another nut-engaging position allowing relative rotation of the nut member.

2. Tap stop means as defined in claim 1, in which said connecting means comprises a biased detent element on one of said members and a recess and an annular groove in longitudinally spaced relation in the other of said members for receiving said detent element respectively in said first-mentioned nut-engaging position and in said other nut-engaging position.

3. Tap stop means as defined in claim 1, in which said connecting means comprises an annular groove in one of said nut and locking members, first and second groove means in the other member, longitudinally spaced from each other and opposable to said annular groove respectively in said first-mentioned position and said other nut-engaging position, and a snap ring disposed in said annular groove selectively engageable with said first and second groove means.

References Cited in the file of this patent

UNITED STATES PATENTS

| | | |
|---|---|---|
| 1,068,211 | Bocorselski | July 22, 1913 |
| 1,528,898 | Sullivan | Mar. 10, 1925 |

FOREIGN PATENTS

| | | |
|---|---|---|
| 449,199 | Germany | Sept. 9, 1927 |